United States Patent
Oono et al.

(12)

(10) Patent No.: US 7,302,974 B2
(45) Date of Patent: Dec. 4, 2007

(54) PROCESS FOR PRODUCING LOW-ALCOHOLIC BEER-LIKE DRINK AND LOW-ALCOHOLIC BEER-LIKE DRINK

(75) Inventors: Masao Oono, Yaizu (JP); Tomohiro Sano, Yaizu (JP)

(73) Assignee: Sapporo Breweries Limited, Tokyo (JP)

( * ) Notice: Subject to any disclaimer, the term of this patent is extended or adjusted under 35 U.S.C. 154(b) by 114 days.

(21) Appl. No.: 10/524,841

(22) PCT Filed: Jul. 18, 2003

(86) PCT No.: PCT/JP03/09186

§ 371 (c)(1),
(2), (4) Date: Feb. 17, 2005

(87) PCT Pub. No.: WO2004/018612

PCT Pub. Date: Mar. 4, 2004

(65) Prior Publication Data

US 2006/0016513 A1    Jan. 26, 2006

(30) Foreign Application Priority Data

Aug. 21, 2002  (JP) ............................. 2002-241159

(51) Int. Cl.
 *B65B 1/04* (2006.01)
(52) U.S. Cl. ............................. 141/9; 141/100; 426/592
(58) Field of Classification Search .................... 141/9, 141/100, 2, 18, 104; 426/592, 11, 16, 29
See application file for complete search history.

(56) References Cited

U.S. PATENT DOCUMENTS 4,788,066 A    11/1988  Witt
4,957,766 A *  9/1990  Maria de Kort et al. ... 426/592

FOREIGN PATENT DOCUMENTS

| EP | 44524    | * | 9/1985  |
| EP | 307051   |   | 3/1989  |
| EP | 0 424 756|   | 5/1991  |
| JP | 01-165358|   | 6/1989  |
| JP | 4-45777  |   | 2/1992  |
| JP | 05-068528|   | 3/1993  |
| JP | 06-343434|   | 12/1994 |
| JP | 7-168    |   | 1/1995  |
| WO | 94/14948 |   | 7/1994  |
| WO | 99-2406  |   | 1/1999  |

OTHER PUBLICATIONS

Guoqing HE, et al., "Research Progress of Malt Beverages", China Applied Industry, Feb. 2000, pp. 42-44.

* cited by examiner

*Primary Examiner*—Steven O. Douglas
(74) *Attorney, Agent, or Firm*—Oblon, Spivak, McClelland, Maier & Neustadt, P.C.

(57) ABSTRACT

It is intended to provide a processing method for producing beer-like low-alcoholic beverage by using usual beer and/or low-malt beer without using any special systems other than those commonly employed in producing beer. Beer and/or low-malt beer obtained by the process commonly employed in producing beer are diluted with carbonated water to lower the alcoholic concentration to less than 1%. After adding additives capable of imparting visual and tasty characteristics thereto, beer-like low-alcoholic beverage can be obtained.

5 Claims, No Drawings

PROCESS FOR PRODUCING LOW-ALCOHOLIC BEER-LIKE DRINK AND LOW-ALCOHOLIC BEER-LIKE DRINK

BACKGROUND OF THE INVENTION

1. Field of the Invention

This invention generally relates to a processing method of beer-taste low-alcoholic beverage, and more particularly, to processing method for producing beer-taste low-alcoholic beverage, in which the alcoholic content is lower than 1 v/v % (volume per volume %), and its flavor and visual characteristics are the same as beer and low-malt beer, and a beer-taste low-alcoholic beverage produced by its processing method.

2. Description of the Related Art

Various processing methods for low-alcoholic fermented beverages using malt which alcoholic content is lower than 1 v/v %, that is so called low-alcoholic beer and non-alcoholic beer, have been developed by those who in the art. These processing methods can be characterized to 3 types for producing.

First type of processing method is that a fermentation process is controlled in the producing process of alcoholic beverages. (Japan patent publication 5-68528, Japan patent publication 6-343434.)

Second type of processing method is that an alcoholic concentration is reduced by distillation, dialysis, etc. after producing of alcoholic beverages. (Japan patent publication 4-45777.)

Third type of processing method is a preparing method with any type of saccharides, a malt extract, flavors, etc. without using beer. (Japan patent publication 1-165358)

However, in order to control the alcoholic concentration, conventional methods of the first type and the second type processing methods use the special method for mashing, brewers' yeast, and a fermentation control substance, or need the special systems for removal of alcohol. Moreover, the third processing method needs to produce all materials for the method in advance. Therefore, each processing method has any problems which should solve. Especially, no beverages produced by conventional processing methods have desirable taste for consumers comparing to the taste of beer.

SUMMARY OF THE INVENTION

It is a general object of the present invention to provide a processing method for producing beer-taste low-alcoholic beverage and the beer-taste low-alcoholic beverage produced using the method. More particularly, the object of the present invention is to provide a processing method for producing beer-taste low-alcoholic beverage, in which by using usual beer or low-malt beer without using any special systems other than those commonly employed in producing beer, beer or low-malt beer obtained by conventional processing method commonly employed for producing beer (so-called usual beer or low-malt beer) are diluted with carbonated water to lower the alcoholic concentration, then adding additives capable of imparting flavor and visual characteristics of a beer or a low-malt beer thereto.

In order to achieve the above-mentioned object, there is provided according to one aspect of the present invention a processing method of a beer-taste low-alcoholic beverage comprising:

diluting beer and/or low-malt beer to lower the alcoholic concentration to less than 1 v/v %, and adding additives capable of imparting visual and flavorful characteristics of beer thereto.

Additionally, in the processing method of the beer-taste low-alcoholic beverage according to the present invention, the beer or low-malt beer is diluted with either of carbonated water, nitrogen water, or mixed water of carbonated water and nitrogen water.

Additionally, in the processing method of the beer-taste low-alcoholic beverage according to the present invention, the additives include a coloring matter and a hop.

Additionally, in the processing method of the beer-taste low-alcoholic beverage according to the present invention, the additives further include at least one material from a material group consisting of acidity agents, saccharides, flavors, malt extract, barley extract, and wheat extract.

Additionally, in the processing method of the beer-taste low-alcoholic beverage according to the present invention, the Brix is 0.1-15° and an acidity is 0.1-15 ml/100 ml for the produced beer-taste low-alcoholic beverage.

In order to achieve the above-mentioned object, there is also provided according to another aspect of the present invention, a beer-taste low-alcoholic beverage processed by the processing method.

As mentioned above, the beer-taste low-alcoholic beverage can be obtained using conventional producing systems for beer or low-malt beer due to reduction of alcoholic concentration for usual beer and/or low-malt beer obtained by conventional processing method and then adding predetermined additives. Moreover, based on usual beer and/or low-malt beer, the taste of the beverage extremely similar to beer or low-malt beer can be offered because a change of the taste by dilution is compensable with various kinds of required additives. In addition, a final product of the low-alcoholic beverage due to the above processing method is superior in the taste, the foam properties, etc compared to conventional low-alcoholic beverages. Also, the present invention can offer the beer-taste low-alcoholic beverage which gives customer's preferable taste and is visually desirable for them.

Other objects, features and advantages of the present invention will become more apparent from the following detailed description.

DESCRIPTION OF THE PREFERRED EMBODIMENTS

A description will now be given, with reference to the embodiments according to the present invention. The processing method for beer-taste low-alcoholic beverage of the present invention is characterized that fermentative alcoholic beverage producing with malts, so-called usual beer or low-malt beer is diluted, then add additives for imparting flavor and visual characteristics thereto so as to compensate the lost flavor and visual characteristics by dilution, thereby non-alcoholic beer is produced.

The processing method for beer-taste low-alcoholic beverage of the present invention is that the additives are added to usual beer and/or low-malt beer, then the beverage is diluted until the alcoholic concentration is predetermined value. Note, here used "usual beer or low-malt beer" means alcoholic beverage like beer or low-malt beer produced with malts via mashing and fermentation process, having 3-10% of the alcoholic concentration, including carbon dioxide.

Materials added to beer or low-malt beer usually used will be explained below.

Coloring Matters:

By using natural coloring matters such as caramel coloring matter, safflower coloring matter, gardenia coloring matter, kaoliang coloring matter, cochineal coloring matter, carrot coloring matter, paprika coloring matter etc, or synthetic coloring matters such as the edible red No.102, the edible red No.104, the edible orange No.201, the edible yellow No.5, the edible yellow No.201, color is determined according to the concept of beer of color from transparent to dark. Its color is controlled with the degree of EBC color (° EBC). For example, if the low-alcoholic beverage is light colored beer, the degree of EBC color is between 4-15° EBC, if the low-alcoholic beverage is dark colored beer, the degree of EBC color is between 16-200° EBC. Also, by using various coloring matters, the produced beer-taste low-alcoholic beverage has various coloring advantage.

Here, explain the degree of EBC color. The degree of EBC color can be obtained from the below formula. Particularly, a degree of light absorption of the beer at 700 nm is subtracted from a degree of light absorption of beer at 430 nm for merely de-gased beer, then after adjusting a degree of muddy, calculates by applying to the following formula. The below formula is expressed as the degree of EBC color.

The degree of EBC color (° $EBC$)=25×$d$×($E$430-$E$700)

d: the rate of dilution

E430, E700: light absorbing degree at 430 nm and 700 nm

Saccharides:

Saccharides like isomerized syrup, a starch syrup, dextrin, oligosaccharide, etc are added between 0.1 and 20 w/v %, preferably between 1 and 10 w/v %. Rich and dense flavors are given to the taste of beer by addition of these saccharides. The rate of addition of any saccharides corresponds to the feature of a final product. For example, if the final product is light-taste low-alcoholic beverage, the amount of addition is reduced. Thus, the amount of addition is optimized according to purposes for the final product.

Acidity Materials:

Acidity materials such as lactic acid, citric acid, malic acid, phosphoric acid, and etc are added, and the acidity is adjusted. The range of pH becomes 2.5-7.0 by adjustment of acidity.

The Processed Material of Hop

Hop pellets, hop extracts and isomerized hop, and the processed material of hop such as tetrahydroisohumulone, and hexahydroisohumulone are added. Hop contributes to adjustment of bitter taste, and improvement in a foam quality, and the range of the amount of addition is 3-80 BU, preferably 5-30 BU.

BU is a unit which indicates a value of bitter taste. More particularly, extracting a bitter taste substance (mainly, iso-α-acid) by isooctane from the acidified beer, then the BU value is given by its concentration by measuring the light absorbing degree at 275 nm. The value of bitter taste (BU) is calculated as following formula.

The value of bitter taste (BU)=$E$275×50

E275: the light absorbing degree at 275 nm

Flavors:

The flavor which can give the flavor of beer and other desirable flavors is added suitably. Not only adding flavors for giving beer-taste but also adding congenial flavors like having citrus-like fresh scent to low-alcoholic beer, new advantages can be given to low-alcoholic beer. Preferably, the amount of addition is the range of 1 to 5000 ppm.

Extracts:

For adding rich and dense taste, extracts such as malt extract, barley extract, wheat extract, and rice extract are added suitably. The amount of addition is the range of 0.1 to 20 w/v %, preferably 1 to 10 w/v %.

Antioxidants:

As antioxidant such as ascorbic acid, sodium ascorbic acid, iso-ascorbic acid, sulfite, and catechin are added suitably. The amount of addition is the range of 5 to 1000 ppm, preferably 10 to 500 ppm.

Other Additive Agents:

Materials for health such as a dietary fiber, oligosaccharide, vitamins, and herb are added as required, thus, low-alcoholic beverage can be produced, and the beverage not only has added new advantage as low-alcohol but also is good for health. The amount of addition is the range of 0.1 to 20 w/v %, preferably 1 to 10 w/v %.

The Dilution Method

In a portion or all of the above-mentioned additive agents, amounts of addition of additive agents are adjusted, and mixed with either of carbonated water (air removed water with carbon dioxide:carbonated water which removed the oxygen which has melted with carbon dioxide as much as possible), nitrogen water (air removed water with nitrogen gas:nitrogen water which removed the oxygen which has melted with nitrogen gas as much as possible) or mixed water of carbonated water and nitrogen water, thus dilution solution is produced. Then, usual beer and/or low-malt beer is diluted using this dilution solution, and the concentration adjustment is performed and targeted beer-taste low-alcoholic beverage is produced. This produced beer-taste low-alcoholic beverage also can be performed for disinfecting by filtration, or the sterilization by the heat treatment. The alcoholic concentration is below than 1 v/v %, and preferably it is adjusted the range of 0.3 to 0.9 v/v %.

In order to consider as beverage similar to beer containing low-alcohol although it is not necessary to add all the above-mentioned additive agents when diluting with carbonated water etc., it is desirable to add at least the coloring matter and the processed material of hop.

Moreover, as required, carbon dioxide and/or nitrogen gas are also dissolved in the above-mentioned beer-taste low-alcoholic beverage, and the pressure of gas is adjusted to 1.0-3.0 kg/cm2.

After being carried out and considered various experiments, as the result, it is characterized that preferably the Brix is 0.1-15° and the acidity is 0.1-15 ml/100 ml, more preferably the Brix is 2.0-7.0° and the acidity is 2.0-8.0 ml/100 ml for the produced beer-taste low-alcoholic beverage.

The illustrative embodiments produced by the processing method for producing beer-taste low alcoholic beverage by the present invention will be explained below.

In below embodiments, beer as usual alcoholic beverage with malt was used as based beer or based low-malt beer, and they were diluted for implementation. The analysis value of the main ingredients of based beer and based low-malt beer is shown below.

TABLE 1

|  | BEER | LOW-MALT BEER |
|---|---|---|
| ORIGINAL WORT EXTRACT | 11.5% | 12.3% |
| BU | 30 | 15 |
| ALCOHOLIC CONCENTRATION | 5 vol % | 5.5 vol % |

TABLE 1-continued

|  | BEER | LOW-MALT BEER |
|---|---|---|
| Σ | 125 | 120 |
| BRIX | 5.8° | 5.4° |
| ACIDITY | 16 ml/100 ml | 10 ml/100 ml |

First Embodiment

In the first embodiment, the beer of Table 1 was used as based beer, each component shown in Table 2 was added, and low-alcoholic beer (0.5 v/v % of alcoholic concentration) was produced as a trial product 1. Table 2 shows each component per 100 ml of produced low-alcoholic beer, and shows the ingredient analysis value of the product in Table 3.

Σ of the analysis value shows the degree of a continuity of foam. This value shows continuation of the foam (the life expectancy of foam) calculated by the following formula. Specifically, bubbling the beer under regular conditions, then the amount of liquids produced from foam at regular time and the amount of liquids produced from the foam which remains at that time are measured.

$$\Sigma = t/2.303 \times \log((b+c)/c)$$

t: Collapse time of foam (seconds)
b: the amount of liquids produced from the foam at t time (ml)
c: the amount of liquids produced from the foam which remains after t time (ml)

The Brix was measured using the refractometer (ATC-1, ATAGO company) in the de-gased beer-taste low-alcoholic beverage.

The degree of acidity of the analysis value was calculated by the following formula. After boiling 50 ml of de-gased beer-taste low-alcoholic beverage for 2 minutes, then cooling to room temperature and adjusting to pH 8.2 with N/10 sodium hydroxide solution using pH meter, then the value can be obtained.

$$\text{All acidity } (N/10 \text{ NaOH ml}/100 \text{ ml}) = a \times F \times 100/V$$

a: the amount of N/10 sodium hydroxide solution for adjusting pH (ml)
F: factor of N/10 sodium hydroxide solution
V: output volume of the produced beer (ml)

Moreover, as mentioned above, the adjustment of concentration was performed by adding carbonated water to various kinds of additive agents.

TABLE 2

EACH COMPONENT PER 100 ml (TRIAL PRODUCT 1)

|  | EACH COMPONENT |
|---|---|
| THE BASED BEER | 9 ml |
| TETRA HOP | 0.015 ml |
| ISOMERIZED SYRUP | 0.5 g |
| DEXTRIN | 3.0 g |
| MALT EXTRACT | 0.4 g |
| CARAMEL COLORING MATTER | 0.05 g |
| LACTIC ACID | 0.02 ml |

TABLE 3

ANALYSIS VALUE (TRIAL PRODUCT 1)

| ORIGINAL WORT EXTRACT | 4.1% |
|---|---|
| BU | 12 |
| ALCOHOLIC CONCENTRATION | 0.5 vol % |
| Σ | 123 |
| THE DEGREE OF COLOR | 11° EBC |
| BRIX | 3.6° |
| ACIDITY | 2.4 ml/100 ml |

Second Embodiment

In the second embodiment, the beer of Table 1 was also used as based beer, each component shown in Table 4 was added, and low-alcoholic beer was produced as a trial product 2. Table 5 shows the ingredient analysis value of the trial product 2.

TABLE 4

EACH COMPONENT PER 100 ml (TRIAL PRODUCT 2)

|  | EACH COMPONENT |
|---|---|
| THE BASED BEER | 9 ml |
| TETRA HOP | 0.01 ml |
| ISOMERIZED SYRUP | 2.0 g |
| DEXTRIN | 3.0 g |
| CARAMEL COLORING MATTER | 0.05 g |
| PHOSPHORIC ACID | 0.02 ml |

TABLE 5

ANALYSIS VALUE (TRIAL PRODUCT 2)

| ORIGINAL WORT EXTRACT | 4.9% |
|---|---|
| BU | 8 |
| ALCOHOLIC CONCENTRATION | 0.5 vol % |
| Σ | 128 |
| THE DEGREE OF COLOR | 11° EBC |
| BRIX | 4.4° |
| ACIDITY | 6.1 ml/10 ml |

Third Embodiment

In the third embodiment, the beer of Table 1 was also used as based beer, each component shown in Table 6 was added, and low-alcoholic beer was produced as a trial product 3. Table 7 shows the ingredient analysis value of the trial product 3.

TABLE 6

EACH COMPONENT PER 100 ml (TRIAL PRODUCT 3)

| | EACH COMPONENT |
|---|---|
| THE BASED BEER | 9 ml |
| ISOMERIZED HOP | 0.015 ml |
| ISOMERIZED SYRUP | 3.0 g |
| DEXTRIN | 3.0 g |
| CARAMEL COLORING MATTER | 1.0 g |
| PHOSPHORIC ACID | 0.02 ml |

TABLE 7

ANALYSIS VALUE (TRIAL PRODUCT 3)

| | |
|---|---|
| ORIGINAL WORT EXTRACT | 5.7% |
| BU | 30 |
| ALCOHOLIC CONCENTRATION | 0.5 vol % |
| Σ | 131 |
| THE DEGREE OF COLOR | 20° EBC |
| BRIX | 5.2° |
| ACIDITY | 6.2 ml/10 ml |

Fourth Embodiment

In the fourth embodiment, the beer of Table 1 was also used as based beer, each component shown in Table 8 was added, and low-alcoholic beer was produced as a trial product 4. Table 9 shows the ingredient analysis value of the trial product 4.

TABLE 8

EACH COMPONENT PER 100 ml (TRIAL PRODUCT 4)

| | EACH COMPONENT |
|---|---|
| THE BASED BEER | 9 ml |
| ISOMERIZED HOP | 0.015 ml |
| ISOMERIZED SYRUP | 10.0 g |
| DEXTRIN | 3.0 g |
| CARAMEL COLORING MATTER | 1.0 g |
| PHOSPHORIC ACID | 0.02 ml |

TABLE 9

ANALYSIS VALUE (TRIAL PRODUCT 4)

| | |
|---|---|
| ORIGINAL WORT EXTRACT | 11.2% |
| BU | 30 |
| ALCOHOLIC CONCENTRATION | 0.5 vol % |
| Σ | 131 |
| THE DEGREE OF COLOR | 20° EBC |
| BRIX | 10.6° |
| ACIDITY | 6.2 ml/10 ml |

Fifth Embodiment

In the fifth embodiment, the low-malt beer (5.5 v/v % of alcoholic concentration) of Table 1 was also used as based beer, each component shown in Table 10 were added, and low-alcoholic beer was produced as a trial product 5. Table 11 shows the ingredient analysis value of the trial product 5.

TABLE 10

EACH COMPONENT PER 100 ml (TRIAL PRODUCT 5)

| | EACH COMPONENT |
|---|---|
| THE BASED BEER | 9 ml |
| ISOMERIZED HOP | 0.015 ml |
| ISOMERIZED SYRUP | 3.0 g |
| DEXTRIN | 3.0 g |
| CARAMEL COLORING MATTER | 1.0 g |
| PHOSPHORIC ACID | 0.04 ml |

TABLE 11

ANALYSIS VALUE (TRIAL PRODUCT 5)

| | |
|---|---|
| ORIGINAL WORT EXTRACT | 5.7% |
| BU | 30 |
| ALCOHOLIC CONCENTRATION | 0.5 vol % |
| Σ | 131 |
| THE DEGREE OF COLOR | 20° EBC |
| BRIX | 5.2° |
| ACIDITY | 12.8 ml/10 ml |

Sixth Embodiment

In the sixth embodiment, the low-malt beer (5.5 v/v % of alcoholic concentration) of Table 1 was also used as based beer, each component shown in Table 12 was added, and low-alcoholic beer was produced as a trial product 6. Table 13 shows the ingredient analysis value of the trial product 6.

TABLE 12

EACH COMPONENT PER 100 ml (TRIAL PRODUCT 6)

| | EACH COMPONENT |
|---|---|
| THE BASED LOW-MALT BEER | 9 ml |
| TETRA HOP | 0.01 ml |
| ISOMERIZED SYRUP | 0.5 g |
| DEXTRIN | 3.0 g |
| MALT EXTRACT | 0.6 g |
| CARAMEL COLORING MATTER | 0.05 g |
| LACTIC ACID | 0.02 ml |

TABLE 13

ANALYSIS VALUE (TRIAL PRODUCT 6)

| | |
|---|---|
| ORIGINAL WORT EXTRACT | 4.2% |
| BU | 7 |
| ALCOHOLIC CONCENTRATION | 0.5 vol % |

TABLE 13-continued

ANALYSIS VALUE (TRIAL PRODUCT 6)

| Σ | 125 |
|---|---|
| THE DEGREE OF COLOR | 100 EBC |
| BRIX | 3.80 |
| ACIDITY | 2.2 ml/10 ml |

Seventh Embodiment

In the seventh embodiment, the low-malt beer (5.5 v/v % of alcoholic concentration) of Table 1 was also used as based beer, each component shown in Table 14 was added, and low-alcoholic beer was produced as a trial product 7. Table 15 shows the ingredient analysis value of the trial product 7.

TABLE 14

EACH COMPONENT PER 100 ml (TRIAL PRODUCT 7)

| | EACH COMPONENT |
|---|---|
| THE BASED LOW-MALT BEER | 9 ml |
| ISOMERIZED HOP | 0.01 ml |
| ISOMERIZED SYRUP | 1.0 g |
| DEXTRIN | 3.0 g |
| CARAMEL COLORING MATTER | 0.05 g |
| PHOSPHORIC ACID | 0.01 ml |

TABLE 15

ANALYSIS VALUE (TRIAL PRODUCT 7)

| ORIGINAL WORT EXTRACT | 4.1% |
|---|---|
| BU | 7 |
| ALCOHOLIC CONCENTRATION | 0.5 vol % |
| Σ | 118 |
| THE DEGREE OF COLOR | 10° EBC |
| BRIX | 3.6° |
| ACIDITY | 2.4 ml/10 ml |

Eighth Embodiment

In the eighth embodiment, the low-malt beer (5.5 v/v % of alcoholic concentration) of Table 1 was also used as based beer, each component shown in Table 16 was added, and low-alcoholic beer was produced as a trial product 8. Table 17 shows the ingredient analysis value of the trial product 8.

TABLE 16

EACH COMPONENT PER 100 ml (TRIAL PRODUCT 8)

| | EACH COMPONENT |
|---|---|
| THE BASED LOW-MALT BEER | 9 ml |
| ISOMERIZED HOP | 0.015 ml |
| ISOMERIZED SYRUP | 1.5 g |
| DEXTRIN | 5.0 g |
| CARAMEL COLORING MATTER | 1.0 g |
| PHOSPHORIC ACID | 0.01 ml |

TABLE 17

ANALYSIS VALUE (TRIAL PRODUCT 8)

| ORIGINAL WORT EXTRACT | 6.6% |
|---|---|
| BU | 30 |
| ALCOHOLIC CONCENTRATION | 0.5 vol % |
| Σ | 109 |
| THE DEGREE OF COLOR | 200° EBC |
| BRIX | 6.0° |
| ACIDITY | 2.9 ml/10 ml |

Raw materials used as additives in the above-mentioned embodiments used the following materials.

Tetrahydroisohumulone: TETRALONE, KALSEC Inc.

Caramel coloring matter: Caramel coloring matter S-239, Ikeda-Toka Corp.

Isomerized syrup: High-Fruct M, Nippon Corn Starch Inc.

Dextrin: K.D.L-H, Nippon Corn Starch Inc.

Malt extract: OTEX PROTOTYPE, Polttimo Inc.

About trial products 1 to 8 produced according to this embodiment, in order to perform evaluation as a marketable product, tasting was done by ten trained panelists by comparing eight kinds of trial products and three kinds of the non-alcoholic beer in commercial products. Evaluation standards are a scent, a taste, a quality of foam, and a color. Positive results indicate 1 to 3 points, negative results indicate −1 to −3 points. The result is shown in table 18. Each number in columns of the table is average value of ten panelists.

TABLE 18

THE QUALITY EVALUATION RESULT OF TRIAL PRODUCTS

| | COMMERCIAL PRODUCTS | | | TRIAL PRODUCTS | | | | | | | |
|---|---|---|---|---|---|---|---|---|---|---|---|
| SAMPLE | A | B | C | 1 | 2 | 3 | 4 | 5 | 6 | 7 | 8 |
| SCENT | −1.0 | −1.2 | −2.0 | 2.3 | 2.6 | 2.0 | 2.3 | 2.1 | 1.4 | 1.6 | 1.4 |
| TASTE | −1.5 | −1.3 | −2.0 | 2.5 | 2.0 | 2.3 | 1.0 | 0.8 | 1.8 | 1.6 | 1.3 |
| THE QUALITY OF FOAM | 0.5 | 0.7 | 1.1 | 1.7 | 2.0 | 2.2 | 2.1 | 1.9 | 2.3 | 1.9 | 1.4 |
| COLOR | 1.5 | 1.5 | 1.3 | 2.0 | 2.0 | 1.4 | 2.1 | 2.0 | 2.1 | 1.9 | 1.3 |

As shown in the above-mentioned evaluation result, all of trial products produced using the processing method by the present invention are equal about the scent, the taste, the quality of foam, and the color as compared with low-alcoholic beer of a commercial product. Especially, the outstanding evaluation result was obtained for the scent, the taste, and the quality of foam. Therefore, it has been proved that the beer-taste low-alcoholic beverage having the scent, the taste, and appearance similar to usual beer can be produced.

As mentioned above, beer-taste low-alcoholic beverage can be obtained using conventional producing systems for beer or low-malt beer due to reduction of alcoholic concentration for usual beer and/or low-malt beer obtained by conventional processing method and then adding predetermined additives. Moreover, based on usual beer and/or low-malt beer, the taste of the beverage extremely similar to beer or low-malt beer can be offered because a change of the taste by dilution is compensable with various kinds of required additives. In addition, a final product of low-alcoholic beverage due to the above processing method is superior in the taste, the foam properties, etc compared to conventional low-alcoholic beverages. Also, the present invention can offer beer-taste low-alcoholic beverage which gives customer's preferable taste and is visually desirable for them.

The present invention is not limited to the specifically disclosed embodiments, and variations and modifications may be made without departing from the scope of the present invention.

The present application is based on Japanese priority application No. 2002-241159 filed on Aug. 21, 2002, the entire contents of which are hereby incorporated by reference.

What is claimed is:

1. A method for producing a beer-tasting low-alcohol beverage comprising:
    diluting a beer and/or low-malt beer produced with malt via mashing and fermentation, and comprising carbon dioxide, to lower the alcohol concentration thereof to less than 1 v/v %, and thereafter adding one or more visual and flavor additives,
    wherein the beer or low-malt beer is diluted with either of carbonated water, nitrogen water, or the mixed water of carbonated water and nitrogen water, and the alcohol concentration is lowered exclusively by said diluting.

2. The method of claim 1,
    wherein the additives include a coloring matter and a hop.

3. The method of claim 2,
    wherein the additives further include at least one material from a material group consisting of acidity agents, saccharides, flavors, malt extract, barley extract, and wheat extract.

4. The method of claim 3,
    wherein the Brix is 0.1-15° and an acidity is 0.1-15 ml/100ml for the produced beer-taste low-alcoholic beverage.

5. A beer-taste low-alcoholic beverage processed by processing method as claimed in claim 1.

* * * * *